Jan. 8, 1952      R. J. TERREY      2,582,084
GUIDE BEARING AND SHAFT
Filed June 10, 1950
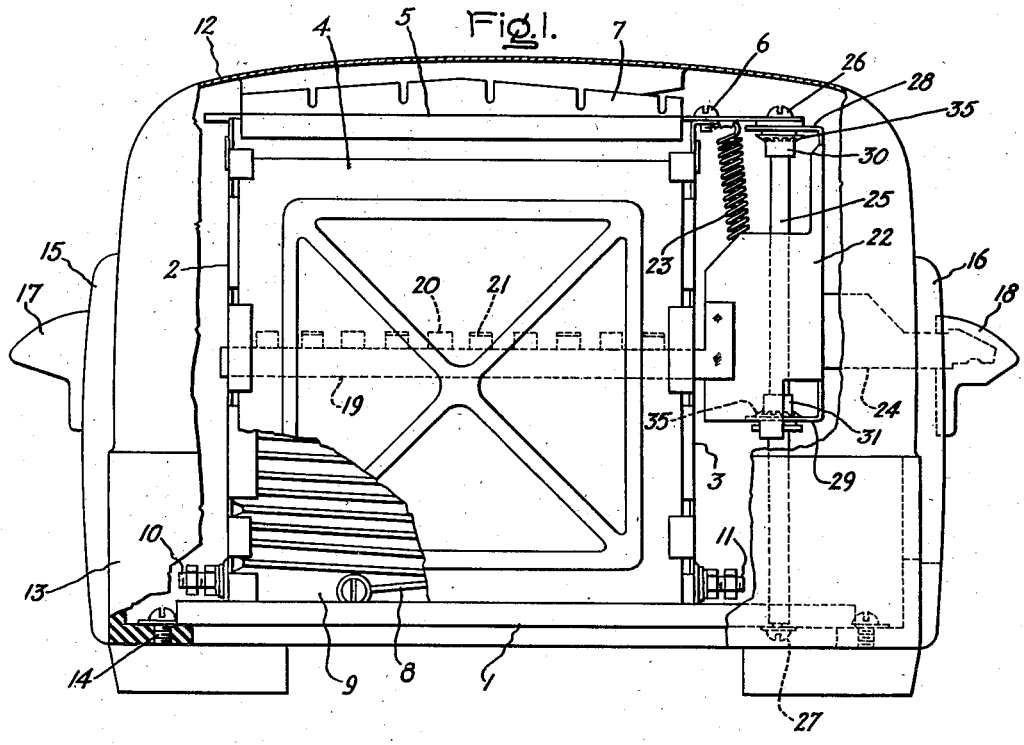
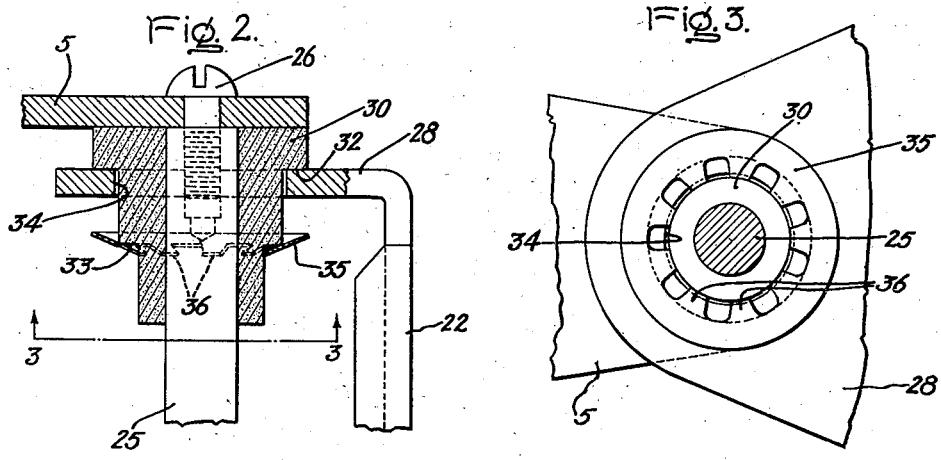
Inventor:
Robert J. Terrey,
by *Sheridan Begg*
His Attorney.

Patented Jan. 8, 1952

2,582,084

UNITED STATES PATENT OFFICE 2,582,084

GUIDE BEARING AND SHAFT

Robert J. Terrey, Allentown, Pa., assignor to General Electric Company, a corporation of New York Application June 10, 1950, Serial No. 167,462

5 Claims. (Cl. 308—4)

1

This invention relates to a dry bearing and shaft construction, which is self aligning and minimizes friction. By the term "dry" bearing is meant a bearing which operates without any of the ordinary liquid or semi-liquid lubricants.

It is a primary object of my invention to provide a combination of bearings with a shaft, which reduces friction upon relative movement of the bearings with respect to the shaft, without the use of a lubricant. It is also an object of my invention to provide a guide bearing construction having spaced self aligning bushings.

More specifically, it is an object of my invention to provide a mounting for a carriage or bread basket in an automatic electric toaster, in which the carriage is movable between a toasting and a non-toasting position on a supporting shaft. In accordance with my invention, friction between the movable toast carriage and its stationary support is minimized without the use of any lubricant. Furthermore, the bushings on the bread carriage are self-aligning.

In accomplishment of the foregoing objectives, a feature of my invention consists in loosely attaching to the toaster carriage a pair of spaced carbon bushings. These bushings, through their loose mounting, are self-aligning and co-operate with a fixed aluminum center post or supporting rod to permit reciprocatory movement of the carriage between its toasting and non-toasting positions. An important feature of my invention is in the use of carbon bushings with an aluminum shaft.

Referring to the drawing, Fig. 1 is a side elevation, partially in section, of an automatic toaster embodying my invention; Fig. 2 is an enlarged sectional view of a portion of the toaster shown by Fig. 1, illustrating my invention in greater detail; and Fig. 3 is a cross sectional view taken on the line 3—3 of Fig. 2.

The features of my invention which I believe to be novel are set forth with particularity in the appended claims. My invention itself, however, both as to its organization and method of operation, along with further objects and advantages thereof, may best be understood by reference to the following description taken in connection with the accompanying drawing, wherein I have shown my invention as applied to an automatic electric toaster.

Referring to Fig. 1 of the drawing, my invention is disclosed as embodied in an automatic electric toaster of a conventional construction. Briefly, the toaster frame includes a base plate 1 to which is attached a pair of end plates 2 and 3

2 and side plates 4, only one of which is shown in Fig. 1. A top plate 5 may be secured to the end plates by suitable attaching means, such as screw 6. Thus, this frame defines an enclosed toasting compartment provided with suitable bread receiving slots through top plate 5. One or more such slots may be provided, which are defined by struck-up flanges 7 from the material of top plate 5.

Suitable heating elements are enclosed within the toasting compartment. These heating elements may take any one of the forms well known in the art. As here shown electrical resistance wire 8 is wound on to a suitable heat resisting support 9 of a material such as sheet mica. Terminals 10 and 11 are provided at convenient points for conducting electrical power to resistance wire 8 of the heating elements.

To protect the components of the toaster and present a pleasing appearance, an outer shell 12 extends over the upper portion of the toaster and is attached to a decorative plastic base 13. Base 13, in turn, may be secured to base plate 1 by suitable threaded fastening means 14. The base portion 13 of the shell may include upwardly extending portions 15 and 16 for mounting of handles 17 and 18 located on opposite ends of the toaster. Handle 17 preferably is rigidly attached to the toaster; while handle 18 serves as an operating member for the toaster mechanism.

While not limited to this one application, my invention is here shown as applied to an electric toaster of the so-called "automatic pop-up" type. It is to be understood, of course, that this invention as disclosed and claimed herein may find many other applications. Referring again to Fig. 1, located within the toasting compartment are one or more bread receiving racks 19. For simplicity, each of these racks consists merely of a strip of sheet metal having a plurality of laterally extending ears 20 and 21, alternately oppositely directed. Thus a slice of bread or toast inserted through one of the bread receiving slots in the top of the toaster may be suitably supported within the toasting compartment. Each of the bread racks is appropriately secured to a carriage plate, here shown as a U-shaped member 22. Normally, the carriage plate is separated from the toasting compartment by end plate 3. Appropriate slots are provided in this end plate through which racks 19 may extend from the toasting compartment to the point of attachment on carriage plate 22.

As is well known in the art, the toast carriage, including the bread carrying racks, is mounted for vertical reciprocatory movement from an upper non-toasting position to a lower toasting position. For the sake of clarity, I have omitted details of the toaster timing mechanism, carriage latches, and switches, since these elements form no part of the present invention.

As shown in Fig. 1, the toast carriage assembly is biased to its upper non-toasting position by a suitable spring 23. Carriage plate 22 has attached thereto an operating arm 24, which extends outwardly through the outer shell of the toaster. The outer end of arm 24 may be appropriately shaped for connection with operating knob 18. Thus, it may be seen that downward pressure on knob 18, through arm 24, moves or depresses the carriage assembly to its lower or toasting position. Any one of the numerous mechanisms well known in the art may be employed for retaining the carriage in its toasting position with the heating element energized during a toasting cycle of a predetermined length. Upon completion of the toasting cycle or at any other desired time, the carriage is moved upwardly to its non-toasting position under the influence of spring 23.

The construction thus far described is more or less conventional and is presented herein only for the purpose of providing a proper background for a clear understanding of my invention. It has been a problem with such toasters to provide a mounting for the toast carriage assembly which will permit free reciprocatory movement between its two positions. Since this device is used as a cooking appliance, it is desirable to eliminate the need for any greases or oils which might contaminate the food or cause smoking during operation. It is, of course, desirable that friction between the toast carriage and its support be minimized for ease of operation. It is to this problem, of a suitable reciprocatory mounting for the toast carriage, that my present invention is directed.

Referring again to the drawing, the carriage supporting member is here shown as a rod 25 anchored in position between top plate 5 and bottom plate 1 by screws 26 and 27 respectively. Thus rod 25 is anchored in a fixed position with respect to the toaster frame. Carriage plate 22 includes upper and lower inwardly directed flanges 28 and 29 respectively. Attached to these flanges are bushings 30 and 31 respectively to provide the slidable mounting of the carriage on supporting rod 25.

The nature of my invention will be understood more clearly by a reference to Figs. 2 and 3, showing in detail the mounting of the bushings and supporting rod. I have found that by employing a carbon bushing in combination with an aluminum shaft, friction is minimized while providing a bearing construction requiring no grease, oil, or any of the other liquid or semi-liquid lubricants; in fact, in accordance with my invention no lubricant whatsoever need be applied to either the busings or the shaft. In particular, bushings 30 and 31 preferably are molded from flake graphite with sufficient clay added to permit molding to the desired shape and to provide the prerequisite structural strength. While rod or shaft 25 may be of pure aluminum, I prefer to employ an alloy of the Duralumin type. For example, an alloy containing 4% copper, .5% manganese, and .5% magnesium, the remainder being pure aluminum, provides a very satisfactory rod for co-operation with the graphite or carbon bushing. This alloy should be properly heat treated by heating it to a temperature of 930° to 950° F. to dissolve the alloy constituents, followed by rapid quenching in cold water. This alloy will then age harden at room temperature in a period of approximately four days. It is to be understood, of course, that other alloys of aluminum may be used within the teaching of this invention; or if desired rod 25 may be a pure aluminum.

As shown in Fig. 2, each bushing 30 or 31 is molded with a first shoulder 32 and a second shoulder 33. Flange 28 of the carriage plate is apertured at 34 with a diameter somewhat larger than the diameter of bushing 30 between shoulders 32 and 33. For this particular application, it is desirable that the bushing fit relatively loosely with the carriage plate so that both bushings 30 and 31 have relative freedom of movement for self alignment. As shown in Fig. 2, the upper portion of bushing 30 has a diameter somewhat larger than that of aperture 34 so that the head of bushing 30 is retained in position with respect to flange 28 of the carriage plate. The lowermost portion of bushing 30 is of reduced diameter to receive a spring locking washer 35. For convenience in assembly, I prefer to use a washer having a plurality of inwardly extending ears 36, so that after the bushing is in position in its flange of the carriage plate, it is merely necessary to press the washer over the end of the bushing whereby the bushing is secured within aperture 34. It is pointed out that sufficient space is allowed between shoulder 32 on the bushing and lockwasher 35 to permit relative movement of the bushing relative to the carriage plate. This construction is a further aid in mounting bushings 30 and 31 so that they are self-aligning regardless of irregularities in manufacturing the carriage plate and punching apertures 34.

In view of the above, it is seen that I have provided a guide bearing and shaft construction which requires no lubrication or attention while still minimizing friction between the shaft and the bearings. Furthermore, this construction is inexpensive in first cost, quickly assembled, and easily repaired at any time should one of the parts fail. Specifically, this invention is of a special utility as applied to the mounting of the toast carriage in an automatic electric toaster.

However, while the present invention has been described by reference to a particular embodiment in a toaster, it is to be understood that numerous modifications and applications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An anti-friction mounting for two relatively movable parts comprising a carbon bushing secured to one of said parts, said bushing having an aperture therethrough, a shaft of aluminum affixed to said other part, said shaft extending through the aperture in said bushing.

2. A guide bearing construction comprising an apertured carbon bushing, means supporting said bushing, and an aluminum shaft extending through said aperture with the shaft relatively movable with respect to the bushing.

3. An anti-friction mounting for two relatively movable parts comprising a carbon bushing secured to one of said parts, said bushing having an aperture therethrough, and a shaft affixed to the other of said parts and extending through said aperture in said bushing, said shaft formed of an aluminum alloy consisting of 4% copper, .5% manganese, .5% magnesium, and the remainder being pure aluminum.

4. A guide bearing construction comprising a carbon bushing provided with an aperture therethrough, means supporting said bushing, and a shaft extending through said aperture with the shaft relatively movable with respect to the bushing, said shaft formed of an aluminum alloy consisting of 4% copper, .5% manganese, 5% magnesium, and the remainder being pure aluminum.

5. In an anti-friction mounting for two relatively movable parts, a plate attached to one of said parts having spaced apertured flanges, a carbon bushing adapted to be loosely mounted in the aperture in each of said flanges, each of said bushings being generally of cylindrical shape and having a first portion of a diameter substantially larger than the aperture in its corresponding flange, an intermediate portion of less diameter than said aperture, and a shoulder defining the other boundary of said intermediate portion, a self-locking washer attached to the small diameter end of said bushing and in abutting relation with said shoulder, and an aluminum shaft affixed to the other of said parts, each of said bushings being apertured to slidably receive said shaft.

ROBERT J. TERREY.

REFERENCES CITED

The following references are of record in the file of this patent:

UNITED STATES PATENTS

| Number | Name | Date |
|---|---|---|
| 2,319,997 | Ireland | May 25, 1943 |